(12) United States Patent
Arcese et al.

(10) Patent No.: US 9,372,712 B2
(45) Date of Patent: *Jun. 21, 2016

(54) OPTIMIZING VIRTUAL STORAGE SIZE IN A VIRTUAL COMPUTER SYSTEM BASED ON INFORMATION RELATED TO VIRTUAL MACHINES, USER INPUTS AND/OR CONFIGURATION PARAMETERS

(75) Inventors: Mauro Arcese, Rome (IT); Giuseppe Ciano, Rome (IT); Marco Imperia, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1102 days.
This patent is subject to a terminal disclaimer.

(21) Appl. No.: 12/940,218

(22) Filed: Nov. 5, 2010

(65) Prior Publication Data
US 2011/0154329 A1 Jun. 23, 2011

(30) Foreign Application Priority Data
Dec. 17, 2009 (EP) ..................................... 09179593

(51) Int. Cl.
*G06F 9/46* (2006.01)
*G06F 9/455* (2006.01)

(52) U.S. Cl.
CPC .. *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,080,051 B1 | 7/2006 | Crawford | |
| 7,155,594 B2 | 12/2006 | Murakami | |
| 7,716,446 B1 * | 5/2010 | Chen et al. | 711/170 |
| 7,856,440 B2 * | 12/2010 | Alpern et al. | 707/756 |
| 8,171,201 B1 * | 5/2012 | Edwards, Sr. | 711/6 |
| 8,332,571 B1 * | 12/2012 | Edwards, Sr. | 711/6 |
| 2004/0221285 A1 * | 11/2004 | Donovan et al. | 718/1 |
| 2005/0027938 A1 * | 2/2005 | Burkey | 711/114 |
| 2005/0232192 A1 * | 10/2005 | Rawson, III | 370/329 |
| 2005/0262505 A1 * | 11/2005 | Esfahany et al. | 718/1 |
| 2007/0288224 A1 | 12/2007 | Sundarrajan et al. | |
| 2009/0222462 A1 * | 9/2009 | Alpern et al. | 707/100 |
| 2010/0228913 A1 * | 9/2010 | Czezatke et al. | 711/112 |
| 2011/0138147 A1 * | 6/2011 | Knowles et al. | 711/170 |
| 2011/0154329 A1 | 6/2011 | Arcese et al. | |
| 2012/0159485 A1 * | 6/2012 | Arcese et al. | 718/1 |

OTHER PUBLICATIONS

"Total Optimization of VMware Host and Virtual Machines," Raxco Software Incorporated, perfectdisk.com/user_data/products/pd10_vmware_datasheet.pdf, 2009.
"Parallels Virtuozzo Containers for Windows Capacity and Scaling," parallels.com/r/pdf/wp/pvc/Parallels_Virtuoz_Containers_WP_capacity_and_scaling.pdf, Feb. 11, 2008.
"Be Green with the HP Storage Works Enterprise Virtual Array White Paper,"-ht4p4/1171028.www7.hp.com/ERC/downloads/4AA1-2793ENW.pdf, Jun. 2007.
"Virtual Platform Disk Optimizer from the Makers of Diskeeper® Real-Time Defragmentation Technology," downloads.diskeeper.com/pdf/V-locity-SpecSheet.pdf, 2009.
Office Action from U.S. Appl. No. 13/405,029 dated Jul. 31, 2012.
Office Action for U.S. Appl. No. 13/405,029 dated Jan. 8, 2013.
Office Action for U.S. Appl. No. 13/405,029 dated Jul. 17, 2013.

* cited by examiner

*Primary Examiner* — Meng An
*Assistant Examiner* — Bradley Teets
(74) *Attorney, Agent, or Firm* — Winstead, P.C.

(57) ABSTRACT

A system and computer program product for optimizing virtual storage in a virtual computer system including at least one virtual machine, each virtual machine being associated with one or more virtual disks. A target set of virtual machines among the virtual machines comprised in the virtual computer system is determined based on information related to the virtual machines and on shrinking constraints. For each virtual machine in the target set of virtual machines, each virtual disk associated with the virtual machine is identified. Furthermore, for each virtual disk associated with the virtual machine, the following occurs: the virtual disk is analyzed, a virtual disk saving quantity based on the virtual disk analysis is estimated, a resized virtual disk based on the estimated virtual disk saving quantity is generated, and the current virtual disk is replaced with the resized virtual disk.

14 Claims, 5 Drawing Sheets

OPTIMIZING VIRTUAL STORAGE SIZE IN A VIRTUAL COMPUTER SYSTEM BASED ON INFORMATION RELATED TO VIRTUAL MACHINES, USER INPUTS AND/OR CONFIGURATION PARAMETERS

CROSS-REFERENCE TO RELATED APPLICATIONS

This application claims priority under 35 U.S.C. §119(a) from European Patent Application No. 09179593.0, filed on Dec. 17, 2009, the contents of which are incorporated herein by reference.

TECHNICAL FIELD

The present invention generally relates to computer systems, and more particularly, to a method and system for resizing virtual storage in a virtual computer environment.

BACKGROUND

Virtualization technologies have become prevalent in the IT market place and in cloud computing industries. Virtualization allows one to run multiple virtual machines on the same host platform, each virtual machine being capable of supporting and executing its own operating system and applications. A "virtual machine" may be thought of as a "virtual" (software) implementation of a physical processing device. While virtualization techniques used to create one or more virtual machines on a physical computer present an efficient use of hardware resources, it may also create various challenges for operating efficiency. One such challenge relates to management of virtual disks. A virtual machine is typically composed of one of more virtual disks used to store the guest operating system, application programs and application data. The virtual disks are stored as files on the host computer or on a remote storage device, and appear to the guest operating system as standard disk drives. Activating the virtual machine and working with it can increase the size of the virtual disks, especially if new software is provisioned. However, if new software is removed from a virtual disk, the virtual disk is not automatically resized. Accordingly, disk resources in the virtual computer system may be wasted and the performance of the virtual machine itself may be degraded.

BRIEF SUMMARY

In one embodiment of the present invention, a computer program product embodied in a computer readable storage medium for optimizing virtual storage size in a virtual computer system comprising at least one virtual machine, each of the at least one virtual machine being allocated one or more virtual disks, the computer program product comprises the programming instructions for determining a target set of virtual machines among the at least one virtual machine comprised in the virtual computer system based on information related to the at least one virtual machine and on shrinking constraints. For each virtual machine in the target set of virtual machines, the computer program product further comprises the programming instructions for identifying each virtual disk allocated to the virtual machine. For each virtual disk allocated to the virtual machine, the computer program product additionally comprises the programming instructions for: analyzing the virtual disk, estimating a virtual disk saving quantity based on the virtual disk analysis, generating a resized virtual disk based on the estimated virtual disk saving quantity, and replacing the virtual disk with the resized virtual disk.

Another form of the embodiment of the computer program product described above is in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

Embodiments of the present invention will now be described by way of example with reference to the accompanying drawings in which like references denote similar elements, and in which.

DETAILED DESCRIPTION

Figure 1:
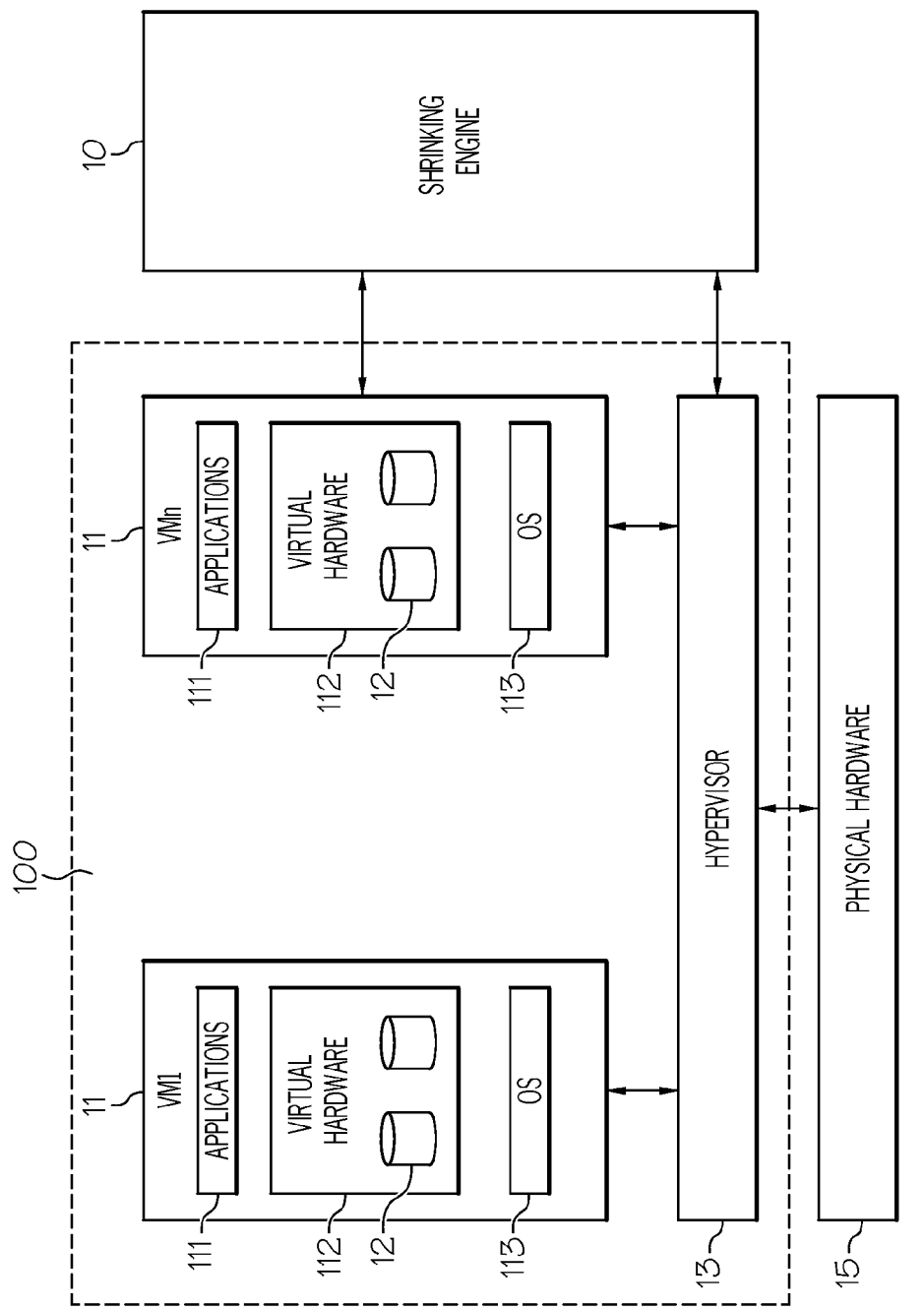
FIG. 1 is a high-level view of a shrinking engine for performing disk shrinking in a virtual computing system according to an embodiment of the present invention.

FIG. 1 shows a shrinking engine 10 for performing disk shrinking in a virtual computing system 100, in accordance with an embodiment of the present invention.

Referring to FIG. 1, the shrinking engine 10 is provided for resizing virtual disks 12 in the virtual computing system 100 based on information related to the virtual machines 11.

In the present description, the term "shrinking" is used to designate the operation consisting in reducing the size of the physical file that contains a virtual disk.

The virtual computer system 100 includes one or more virtual machines 11 (VM1, ... , VMn). Each virtual machine 11 in the virtual computer system 100 represents a software abstraction of a physical computer system that is installed as a "guest" on a "host" hardware platform 15. The host hardware platform 15 may include one or more processors, memory, storage devices, disk drives, and network connection devices for transfer of data between the system and a network, such as the Internet. In one embodiment, the components of virtual computer system 100 execute on host hardware platform 15. In particular, these components may be loaded into memory for execution by a processor in the host hardware platform 15.

Even if the shrinking engine 10 is shown as separated from the virtual computer system 100, the skilled person in the art will easily understand that the shrinking engine 10 may be totally or partially included in the computer system 100.

Each virtual machine 11 includes a guest operating system 113, guest applications 111 running on the guest operating system 113, and virtual hardware 112 which represents a hardware state of the virtual machine. Virtual hardware 112 refers to the hardware resources allocated to the virtual machine 11 and is mapped to hardware platform 15. The virtual hardware 112 comprises one or more virtual disks 12. The virtual disks 12 comprise the operating system files and any other applications and/or data installed on the system. From a guest operating system point of view, each virtual disk 12 is seen as a hard disk. The virtual hardware 112 also comprises one or more virtual CPUs, a virtual system memory, and may further comprise various virtual devices for which the guest operating system 113 may include corresponding drivers. All of the components of the virtual machine may be implemented in software using known techniques to emulate the corresponding physical system components.

Each application 111 and the guest operating system 113 behave as if they were running on their own real computer. Executable files are accessed by the guest OS 113 from the virtual disks 12 or the virtual memory of virtual hardware 112 that represent portions of the actual physical disk or memory allocated to the virtual machine 11. Once an application is installed within the virtual machine 11, the guest OS 113 retrieves files from the virtual disks 12 as if they were stored by a conventional application installation mechanism.

The virtual computer system 100 further comprises a hypervisor 13 also known as a Virtual Machine Monitor for managing the virtual machines 11. The hypervisor 13 forms a layer of system software that runs under the guest operating systems 113 of the virtual machines 11.

In particular, the hypervisor 13 runs between the virtual machines 11 and the underlying hardware platform 15 which is responsible for actually executing virtual machine instructions and transferring data to and from the actual memory and storage devices. Although only one hypervisor 13 is shown, the skilled person will readily understand that each virtual machine 11 in the virtual computer system 100 may include its own hypervisor 13.

In accordance with certain embodiments of the invention, the hypervisor 13 can be coupled to the shrinking engine 10 to resize the virtual disks 12 based on information related to the virtual machines 11 and on shrinking constraints. Alternatively, the shrinking engine 10 may be part of the hypervisor 13.

The shrinking engine 10 is configured to receive information related to the virtual machines 11 and shrinking constraints (user inputs and/or configuration parameters), and analyze the virtual disks 12 in the virtual computer system 100 based on the received information. The shrinking engine 10 then estimates a disk saving quantity, resulting from the virtual disk analysis, and resizes the virtual disks 12 based on the estimated disk saving quantity.

Figure 2:
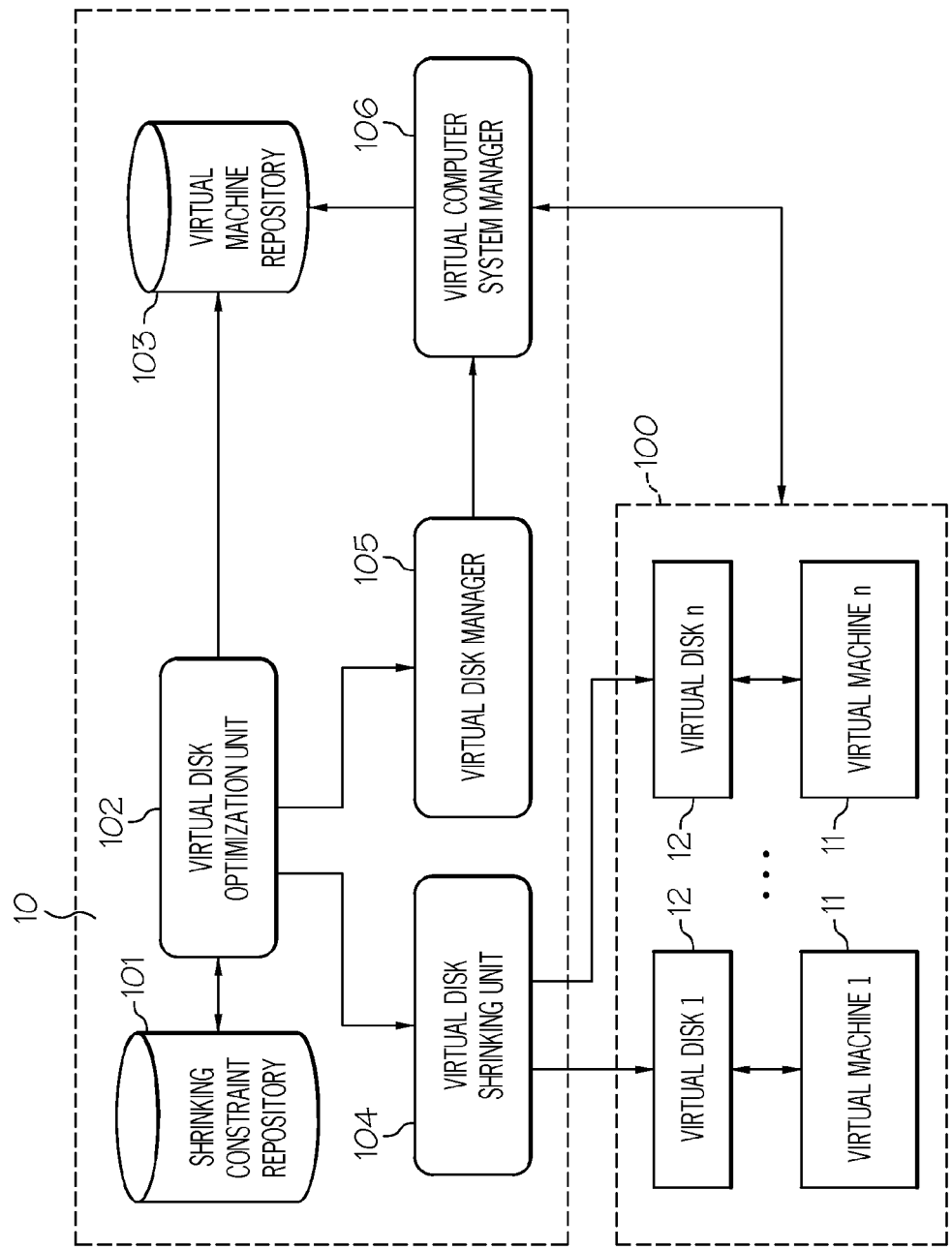
FIG. 2 is a block diagram showing an exemplary implementation of a virtual disk shrinking engine according to an embodiment of the present invention.

FIG. 2 is a block diagram illustrating the structure of the shrinking engine 10, according to an embodiment of the present invention.

The shrinking engine 10 comprises a virtual disk optimization unit 102 for retrieving information about the virtual machines 11 included in the virtual computer system 100, such as virtual machine state information, identification of the virtual disks 12 composing each virtual machine 11, etc. The information may be retrieved from a virtual machine repository 103 coupled to the virtual disk optimization unit 102 through suitable communication means. For example, the virtual machine repository 103 can be implemented using a relational database communicating with the virtual disk optimization unit 102 through the database driver used by the client to connect to the database server of repository 103, or according to yet another example, in Java implementations of the present invention (Java and all Java-based marks are a trademark or registered trademark of Sun Microsystems, Inc, in the United States and other countries at the time of the filing of the present patent application), the virtual disk optimization unit 102 could be coupled with the database server of the virtual machine repository 103 using a Java Database Connectivity (JDBC) driver that communicates via TCP/IP with the database server of the virtual machine repository 103.

The virtual machine repository 103 contains information about the hosts and the virtual machines 11. The repository 103 may include, for example, for each virtual machine 11:
the virtual machine status,
the virtual machine name,
the number of virtual disks included in the virtual machine,
For each virtual disk comprised in the virtual machine, some historical data related to how the size of the virtual disks vary overtime, and
For each virtual disk, the access permissions for the disk.

The virtual disk optimization unit 102 is further provided to coordinate the other components included in the shrinking engine 10 to perform virtual disk optimization. The virtual disk optimization unit 102 can run locally on the host or remotely.

The virtual disk optimization unit 102 is in particular adapted to provide the information maintained in the repository 103 to the other components of the shrinking engine 10 in order to determine when an optimization operation has to be started and toward which virtual machines 11 (target virtual machines). When it determines that a shrinking operation is to be performed, the virtual disk optimization unit 102 further orchestrates the cooperation of the shrinking engine components to achieve the shrinking operation.

The shrinking engine 10 further includes a virtual computer system manager 106 for managing all the virtual machines 11 in the virtual computer system 100 and store the collected information about the managed virtual machines 11 in the virtual machine repository 103. In the embodiments where the virtual disk optimization unit 102 runs remotely on the host, the virtual disk optimization unit 102 may be further connected to the virtual computer system manager 106 through suitable communication means, such as through the TPC/IP protocol, for example using HTTP requests.

The virtual computer system manager 106 has knowledge of all the virtual machines 11 defined in the system and manages the information stored in the virtual machine repository 103. The virtual computer system manager 106 may further interact with the hypervisor 13 to retrieve all the needed information to populate the virtual machine repository 103, such as the list of virtual machines 11, the associated disks, the disk sizes, etc.

The shrinking engine 10 also comprises a virtual disk manager 105 for managing access to the virtual disks 12 through the virtual computer system manager 106.

The shrinking engine 10 is further provided with a virtual disk shrinking unit 104 for identifying the virtual disks 12 that require shrinking (target virtual disks) and analyzing the virtual disks 12 based on information related to the virtual machines 11 in the virtual computer system 100 (stored in repository 103), and shrinking the identified virtual disks 12 based on the virtual disk analysis. The virtual disk shrinking unit 104 calculates an estimated disk saving quantity based on the analysis results and performs the shrinking based on the estimated disk saving quantity. To resize the virtual disks 12, the virtual disk shrinking unit 104 may also take into account shrinking constraints (user inputs and/or configuration parameters).

The shrinking unit 104 is adapted to access the file systems where virtual disks 12 are stored. The virtual disk shrinking unit 104 is further coupled to the virtual disk optimization unit 102 to receive information about the virtual machines 11 comprised in the virtual computer system 100.

The shrinking constraints defined by user inputs and/or configuration parameters are handled by the virtual disk optimization unit 102. The virtual disk optimization unit 102 is adapted to provide the shrinking constraints to the components of the shrinking engine 10 so that they can adapt their behavior according to the values of the shrinking constraints.

The shrinking constraints may be specified by the user or the system administrator through a suitable administrative user interface. The shrinking constraints may include a first set of constraints consisting of a number of parameters and/or rules that may be used by the shrinking engine 10 to trigger the shrinking operations in accordance with certain embodiments of the present invention, such as, for example, a scheduling frequency parameter for the periodic execution of the virtual disk shrinking operations. These constraints may also include a second set of constraints comprising parameters and/or rules that may be used by the shrinking engine 10 to determine a target set of virtual machines including one or more virtual machines 11 that are to be shrunk, in accordance with certain embodiments of the present invention. The second set of constraints may include information for identifying a target set of virtual machines statically specified by the user. Alternatively, the second set of constraints may include information and predefined rules that may be used by the virtual disk shrinking unit 104 to dynamically compute the target set of virtual machines, such as conditions related to the usage of the disk space and its variations. For example, the virtual disk shrinking unit 104 may determine that a particular virtual disk 12 needs to be shrunk (marked as target virtual disk) because from the analysis of the disk, it is determined that the physical size of the virtual disk 12 is much larger than the virtual size of the disk, and disk variations are infrequent.

In certain embodiments of the present invention, the shrinking constraints are maintained in a shrinking constraint repository 101 managed by the virtual disk optimization unit 102. The shrinking constraint repository 101 may be implemented as an internal repository, for example, through a configuration file such as an Extensible Markup Language (XML) file. The shrinking constraints may be configured and updated by the user through an administrative interface that the virtual disk optimization unit 102 provides. Such an interface may be a graphical interface or a command line interface.

The components of the shrinking engine 10 cooperate to orchestrate the monitoring and the analysis of the virtual machines 11 available in the virtual computer system 100, taking into account a number of information related to the available virtual machines 11 such as their availability, their usage, the frequency of varying disk-space conditions. The shrinking engine 10 may further interact with the virtual computer system 100 to deactivate a given virtual machine 11 before starting the optimization process on this virtual machine 11, to ensure exclusive access to this machine 11 during the whole optimization process. When the optimization process is completed on this machine 11, the shrinking engine 10 will then reactivate the virtual machine 11.

In FIG. 2, each virtual machine 11 such as VM1 or VMn is shown as being associated with a unique virtual disk 12, such as respectively Virtual Disk 1 and Virtual Disk n, for illustrative purposes. The skilled person in the art will easily understand that alternatively, each virtual machine 11 can include more than one virtual disk 12.

Figure 3:
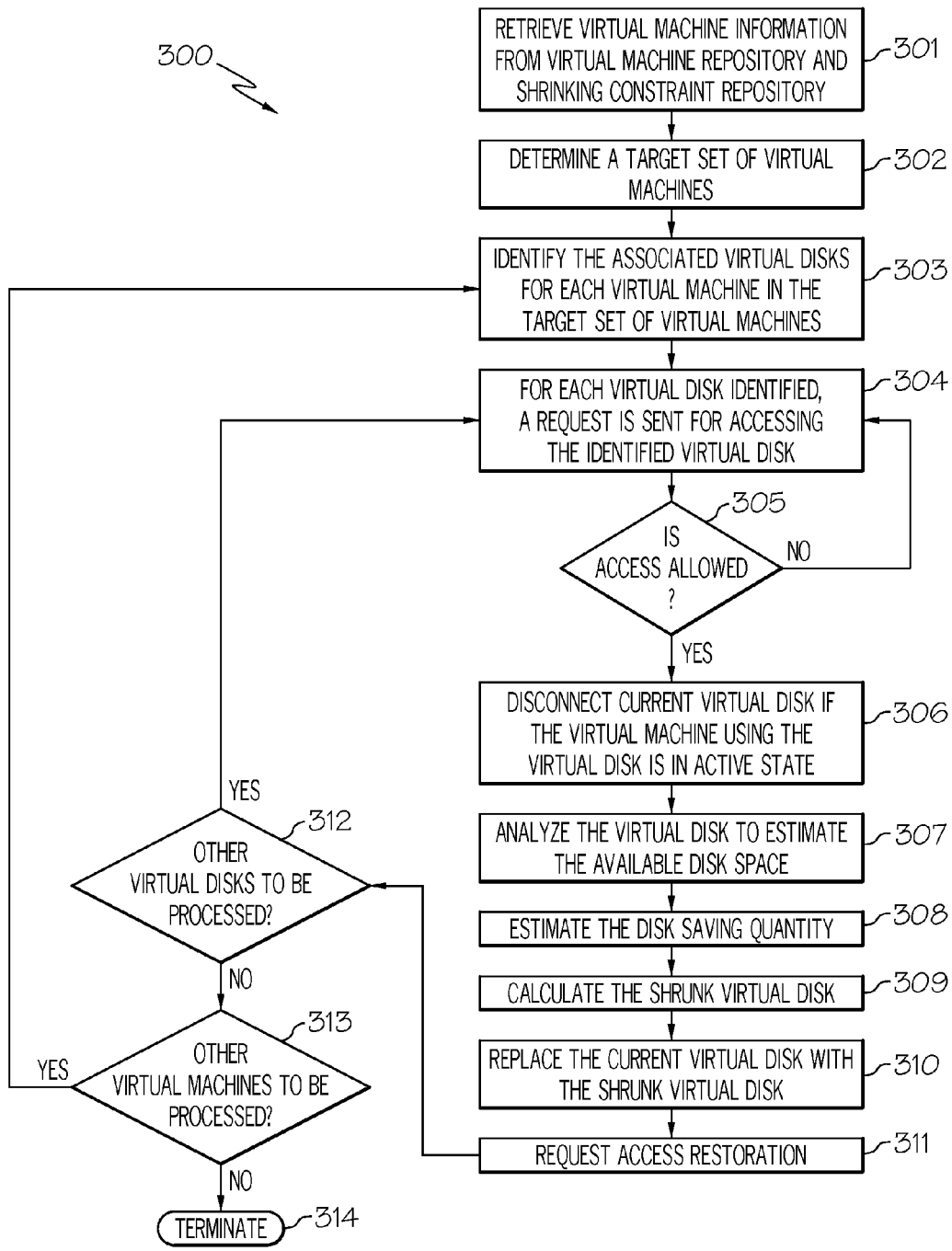
FIG. 3 is a flowchart of a method for shrinking virtual disks in accordance with an embodiment of the present invention.

FIG. 3 is a flowchart of a method 300 for shrinking virtual disks according to an embodiment of the present invention. According to this embodiment of the present invention, the target set of virtual machines is determined independently of the virtual disk features.

The virtual disk shrinking process (also referred to as "optimization process" in the present description) may be triggered by the user or the system administrator. Alternatively, it may be triggered periodically according to a predefined scheduling frequency using the first set of constraints in the shrinking constraint repository 101 (FIG. 2). According to yet another embodiment of the invention, the virtual disk shrinking process may be dynamically triggered based on the reception of special events generated in the computer system. For example the shrinking engine 10 (FIGS. 1 and 2) may provide a command line interface to be used to notify it that a specific event has occurred.

Referring to FIG. 3, in conjunction with FIGS. 1-2, in step 301, the virtual disk optimization unit 102 retrieves information about the hosts, the virtual machines 11 available in the virtual computer system 100 and their virtual disks 12 from repository 103 and the shrinking constraints stored in the shrinking constraint repository 101. The information retrieved from repository 103 may include the list of virtual machines 11 and for each virtual machine 11, the list of virtual disks 12, as well as data related to the virtual disk usage.

In step 302, the virtual disk shrinking engine 10 determines a target set of virtual machines 11 in the virtual computer system 100 to which the shrinking operations are to be applied. The target set of virtual machines 11 may have been defined statically by the user (stored in the shrinking constraint repository), or alternatively, it may be computed by the virtual disk shrinking unit 104 based on the shrinking constraints defined in the shrinking constraint repository 101 and the information related to the status of the virtual machines 11 as retrieved in step 301. For example, it may apply a rule, such as selecting in the target set of virtual machines 11, the virtual machines 11 being in an inactive state among the virtual machines 11 available in the virtual computer system 100.

In step 303, for each virtual machine 11 in the target set of virtual machines 11 identified in step 302, the virtual disk optimization unit 102 identifies the associated virtual disks 12. In certain embodiments of the invention, priority information may be maintained in repository 103 and retrieved in step 302, and step 303 may use this priority information to sort the virtual machines 11 belonging to the target set and process them according to this ordering.

In step 304, for each virtual disk 12 identified in step 303, the virtual disk optimization unit 102 sends a request for accessing the identified virtual disk 12 to the virtual disk manager 105. Depending on the profile of the user/administrator that started the shrinking process, the access to a given virtual disk 12 may not be granted. The virtual disk manager 105 may retrieve access information from repository 103. For example, each user/administrator may only have access to a subset of the virtual disks 12 available in the computer system. The virtual disk manager 105 may grant or deny access according to the profile of the user that is starting the shrinking process and to the permissions associated to the virtual disks 12 that are to be optimized. Additionally, the virtual disk manager 105 may also grant or deny access depending on the number of current accesses to the virtual disks 12 (ensuring for example that no more than one entity is accessing a given disk in exclusive mode), or depending on whether the virtual disk 12 is already being processed by the shrinking engine 10.

In step 305, a determination is made by the virtual disk manager 105 as to whether access to the virtual disk 12 is allowed.

If access is not granted, then, the next virtual disk 12 is processed by repeating step 304 for the next virtual disk 12.

If, however, the virtual disk manager 105 determines that access to the virtual disk 12 is allowed, then, in step 306, virtual disk shrinking unit 104 disconnects the current virtual disk 12 if the virtual machine 11 using the virtual disk 12 is in an active state. To disconnect the virtual disk 12 from the virtual machine 11, the virtual machine 11 is powered off.

In step 307, the virtual disk shrinking unit 104 analyzes the virtual disk 12 to estimate the available disk space inside the virtual disk 12 (estimate the available disk space parameter USED_INTERNAL_SIZE as discussed further below in connection with FIG. 5).

In step 308, the virtual disk shrinking unit 104 estimates a disk saving quantity based on the available disk space parameter USED_INTERNAL_SIZE estimated in step 307. More specifically, the disk saving quantity is computed as the difference between the virtual disk size VD_SIZE and the available disk space parameter USED_INTERNAL_SIZE.

In step 309, the virtual disk shrinking unit 104 then calculates the virtual disk size of the shrunk virtual disk based on the estimated disk saving quantity.

Step 309 is performed using a shrinking mechanism depending on the virtualization technology. For example, for VMware virtualization technology (VMware is a registered trademark or trademark of VMware, Inc. in the United States and/or other jurisdictions), the following steps may be performed to shrink the virtual disk:

mounting the virtual disk on the host operating system where the virtual disk shrinking unit is running using, for example, the command line vmware-mount M: "myVm.vmdk" where "M:" designates the name of the drive where the disk is attached and "myVm.vmdk" designates the name of the physical file containing the virtual disk, triggering the wiping operation, unmounting the disk from the host operating system, and actually shrinking the disk.

In step 310, the current virtual disk 12 is finally replaced with the shrunk virtual disk in virtual computer system 100.

In step 311, the virtual disk 12 is reconnected to the virtual machine 11 (when the disk 12 is reconnected to the virtual machine 11, the virtual machine 11 may be powered-on again) and then the virtual disk manager 105 is requested to restore former access. In step 311, the shrinking unit 104 notifies the virtual disk manager 105 that it has finished working on the virtual disk 12. In this way, the virtual disk manager 105 is informed that the disk 12 is not used anymore and may grant the permission to access it to another entity that requests it.

In step 312, a determination is made as to whether there are other virtual disks 12 that have not yet been processed. If there are other virtual disks 12 to be processed, then the next virtual disk 12 is processed by repeating step 304 for the next virtual disk 12.

If, however, all the virtual disks 12 of the virtual machine 11 have been processed, then, in step 313, a determination is made as to whether there are other virtual machines 11 in the target set of virtual machines 11 that have not been processed. If there are other virtual machines 11 in the target set of virtual machines 11 that have not been processed, then the virtual disk optimization unit 102 identifies the virtual disks 12 associated with the next virtual machine 11 in the target set of virtual machines 11 in step 303.

If, however, all the virtual machines 11 in the target set of virtual machines 11 have been processed, then the shrinking operations are terminated in step 314.

Method 300 may include other and/or additional steps that, for clarity, are not depicted. Further, method 300 may be executed in a different order presented and the order presented in the discussion of FIG. 3 is illustrative. Additionally, certain steps in method 300 may be executed in a substantially simultaneous manner or may be omitted.

Figure 4:
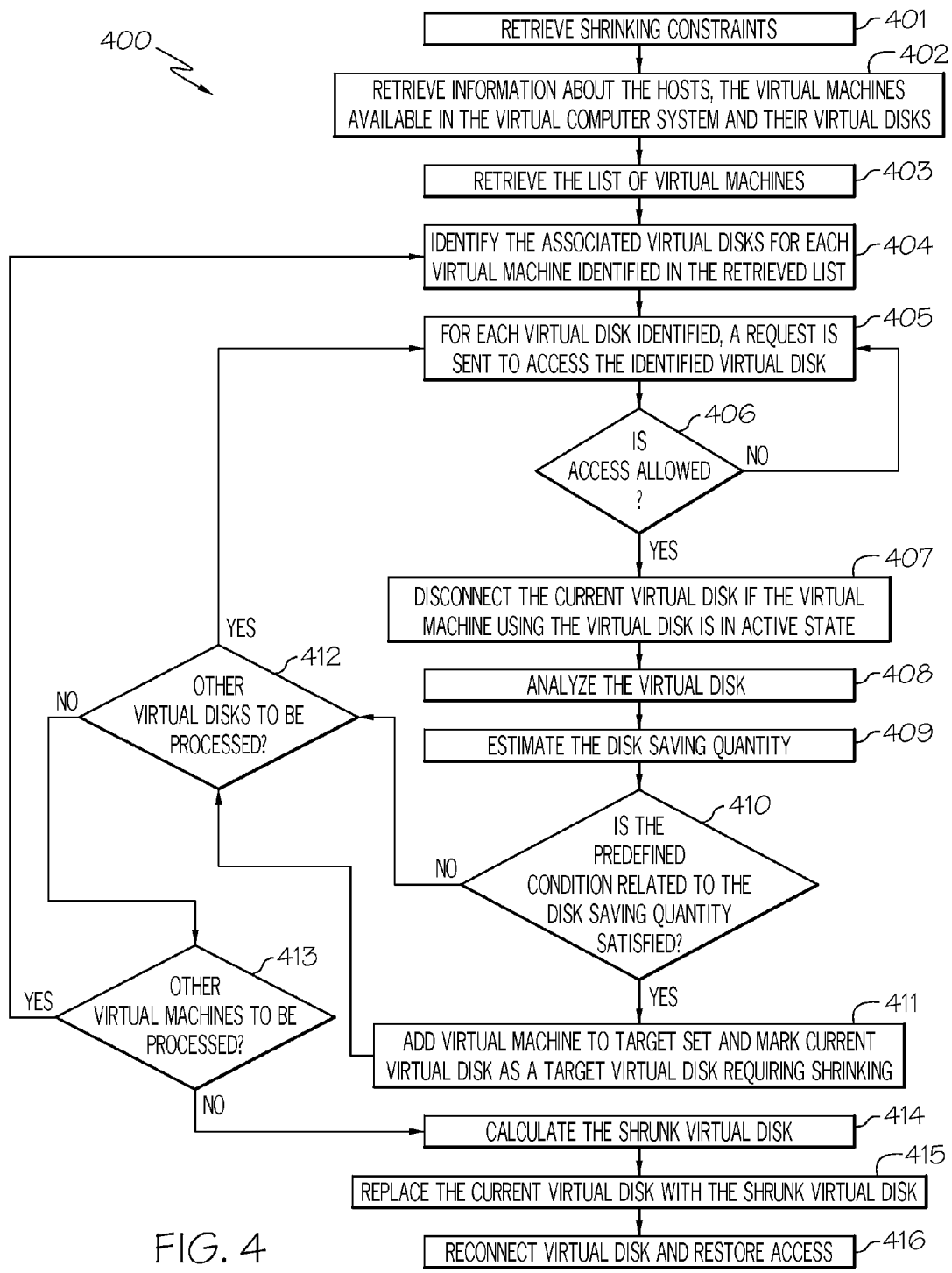
FIG. 4 is a flowchart of a method for shrinking virtual disks in accordance with another embodiment of the present invention.

FIG. 4 is a flowchart of a method 400 for shrinking virtual disks 12 (FIGS. 1 and 2) according to another embodiment of the present invention. According to this embodiment of the present invention, the target set of virtual machines 11 is determined based on conditions related to the virtual disk features.

Referring to FIG. 4, in conjunction with FIGS. 1-3, in step 401, the constraints maintained in the shrinking constraint repository 101 are retrieved by the virtual disk optimization unit 102, as in step 301.

In step 402, the virtual disk optimization unit 102 retrieves information about the hosts, the virtual machines 11 available in the virtual computer system 100 and their virtual disks 12, as in step 301.

In step 403, the list of the virtual machines 11 defined in the environment is retrieved.

For each virtual machine identified in step 403, the virtual disk optimization unit 102 identifies the associated virtual disks 12 in step 404. Similarly to step 303, priority information may be retrieved from repository 103 and used to sort the virtual machines 11 identified in step 403 and process them accordingly.

In step 405, for each virtual disk identified in step 404, the virtual disk optimization unit 102 requests access to the identified virtual disk 12 to the virtual disk manager 105, such as step 304.

In step 406, a determination is made as to whether access to the virtual disk 12 is allowed.

If access is not granted, then the next virtual disk 12 is processed by repeating step 405 for the next virtual disk 12.

If, however, access to the virtual disk 12 is allowed, then, in step 407, virtual disk shrinking unit 104 disconnects the current virtual disk 12 if the virtual machine 11 using the virtual disk 12 is in the active state. To disconnect the virtual disk 12, the virtual machine 11 is powered off.

In step 408, the virtual disk shrinking unit 104 analyzes the virtual disk 12 to estimate the available disk space inside the virtual disk 12 (estimate the available disk space parameter USED_INTERNAL_SIZE as discussed further below in connection with FIG. 5).

In step 409, the virtual disk shrinking unit 104 estimates a disk saving quantity based on the available disk space parameter USED_INTERNAL_SIZE estimated in step 408. The disk saving quantity is computed as the difference between the virtual disk size VD_SIZE and the available disk space parameter USED_INTERNAL_SIZE.

In step 410, the virtual disk shrinking unit 104 determines if a predefined condition related to the disk saving quantity is satisfied based on the shrinking constraints identified in step 401 and possibly additional information related to the current virtual disk 12 that may be stored in repository 103 (such as statistical data). The predefined condition may, for example, comprise comparing whether the disk saving quantity is greater than a threshold parameter, or checking whether there is a considerable difference between the current virtual disk usage with respect to the host occupancy.

If the condition of step 410 is satisfied, then, in step 411, the current virtual machine 11 is added to the target set of virtual machines 11 and the current virtual disk 12 is marked as a target virtual disk 12 requiring shrinking. If the condition of step 410 is not satisfied, or after step 411, then, in step 412, a determination is made as to whether there are other virtual disks 12 that have not yet been processed. If there are other virtual disks 12 to be processed, then the next virtual disk 12 is processed by repeating step 405 for the next virtual disk 12.

If, however, all the virtual disks 12 of the virtual machine 11 have been processed, then, in step 413, a determination is made as to whether there are other virtual machines 11 in the target set of virtual machines 11 that have not been processed. If there are other virtual machines 11 in the target set of virtual machines 11 that have not been processed, then the virtual disk optimization unit 102 identifies the virtual disks 12 associated with the next virtual machine 11 in the target set of virtual machines 11 in step 404.

If, however, all the virtual machines 11 in the target set of virtual machines 11 have been processed, then, in step 414, for each virtual disk 12 marked in step 411, the virtual disk shrinking unit 104 calculates the virtual disk size of the shrunk virtual disk based on the estimated disk saving quantity, and in step 415, the current virtual disk 12 is finally replaced with the shrunk virtual disk in virtual computer system 100, as in steps 309 and 310.

In step 416, the virtual disk 12 is reconnected to the virtual machine 11 (the virtual machine is reactivated if it was powered off in step 407) and former access is restored. Similarly to step 311, the shrinking unit 104 notifies the virtual disk manager 105 that it has finished working on the virtual disk 12.

Method 400 may include other and/or additional steps that, for clarity, are not depicted. Further, method 400 may be executed in a different order presented and the order presented in the discussion of FIG. 4 is illustrative. Additionally, certain steps in method 400 may be executed in a substantially simultaneous manner or may be omitted.

Figure 5:
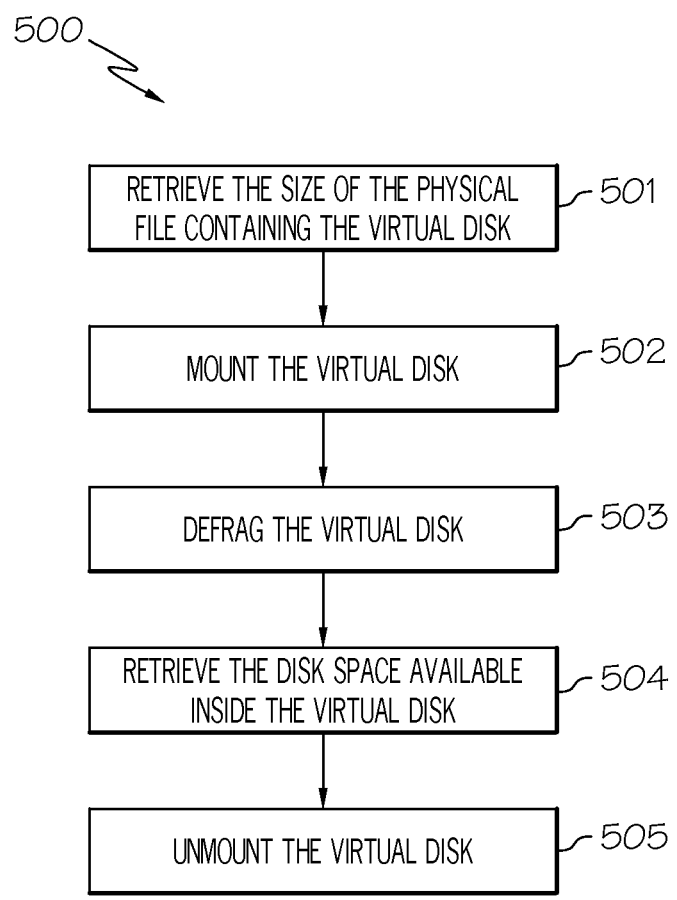
FIG. 5 is a flowchart of a method for analyzing a virtual disk in accordance with an embodiment of the present invention.

FIG. 5 is a flowchart of a method 500 for analyzing a virtual disk (steps 307 and 408) in accordance with an embodiment of the present invention.

Referring to FIG. 5, in conjunction with FIGS. 1-2, in step 501, the virtual disk shrinking unit 104 retrieves the size of the physical file containing the virtual disk (VD_SIZE).

In step 502, the virtual disk shrinking unit 104 mounts the virtual disk 12 and then defrags the virtual disk 12 in step 503.

In step 504, the virtual disk shrinking unit 104 retrieves the disk space available inside the virtual disk (USED_INTERNAL_SIZE) and then unmounts the virtual disk in step 505.

Method 500 may include other and/or additional steps that, for clarity, are not depicted. Further, method 500 may be executed in a different order presented and the order presented in the discussion of FIG. 5 is illustrative. Additionally, certain steps in method 500 may be executed in a substantially simultaneous manner or may be omitted.

The present invention accordingly provides remote monitoring usage of virtual machines in a virtual computer system, such as a virtual data center, and optimization of virtual disk images.

The present invention thereby allows optimization of virtual storage in virtual computer systems (such as data centers) by reducing the size of the physical file that contains a virtual disk based on information related to the virtual machines (such as their availability, usage, frequency of varying disk-space conditions), and on user inputs, and/or configuration parameters.

The system, computer program product and method according to embodiments of the present invention make it possible to detect, according to a given set of policies, if a given virtual machine and its virtual storage, require a shrinking process. In particular, only the virtual machines that fit selected criteria (such as infrequent changes of virtual size of the disk, considerable delta between the current virtual disk usage with respect to the host occupancy) may be selected to go through the optimization process. The shrinking method and process according to the embodiments of the present invention do not generate a growing number of virtual machines and virtual appliances, thereby optimizing energy consumption. It further improves the speed of the host system by optimizing the disk structure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium and a computer readable signal medium are mutually exclusive. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A computer program product embodied in a computer readable storage medium for optimizing virtual storage size in a virtual computer system comprising at least one virtual machine, each of said at least one virtual machine being allocated one or more virtual disks, the computer program product comprising the programming instructions for:
   determining a target set of virtual machines among said at least one virtual machine comprised in said virtual computer system based on information related to said at least one virtual machine and on shrinking constraints;
   for each virtual machine in said target set of virtual machines, identifying each virtual disk allocated to said virtual machine; and
   for each virtual disk allocated to said virtual machine, analyzing said virtual disk, estimating a virtual disk saving quantity based on the virtual disk analysis, generating a resized virtual disk based on the estimated virtual disk saving quantity, and replacing said virtual disk with said resized virtual disk.

2. The computer program product of claim 1, wherein the programming instructions for determining said target set of virtual machines comprises the following programming instructions for each virtual machine in said virtual computer system and for each virtual disk in said each virtual machine:
   analyzing said virtual disk; and
   adding said virtual machine to said target set of virtual machines if a condition related to a state of at least one virtual disk allocated to said virtual machine is satisfied.

3. The computer program product of claim 2 further comprising the programming instructions for:
   marking said virtual disk satisfying said condition.

4. The computer program product of claim 1, wherein the target set of virtual machines is identified by said shrinking constraints.

5. The computer program product of claim 1, wherein the programming instructions for determining the target set of virtual machines comprises the following programming instructions for each virtual machine in the virtual computer system:
   adding the virtual machine to the target set if a condition related to a virtual machine state is satisfied.

6. The computer program product of claim 5, wherein said condition comprises checking if a current virtual machine is in an active state.

7. A computer program product embodied in a computer readable storage medium for optimizing virtual storage size in a virtual computer system comprising at least one virtual machine, each of said at least one virtual machine being allocated one or more virtual disks, the computer program product comprising the programming instructions for:
   determining a target set of virtual machines among said at least one virtual machine comprised in said virtual computer system based on information related to said at least one virtual machine and on shrinking constraints;
   for each virtual machine in said target set of virtual machines, identifying each virtual disk allocated to said virtual machine; and
   for each virtual disk allocated to said virtual machine, analyzing said virtual disk, estimating a virtual disk saving quantity based on the virtual disk analysis, generating a resized virtual disk based on the estimated virtual disk saving quantity, and replacing said virtual disk with said resized virtual disk;
   wherein the programming instructions for determining said target set of virtual machines comprises the following programming instructions for each virtual machine in said virtual computer system and for each virtual disk in said each virtual machine:
   analyzing said virtual disk; and
   adding said virtual machine to said target set of virtual machines if a condition related to a state of at least one virtual disk allocated to said virtual machine is satisfied;
   wherein said condition comprises at least one of the following: checking if the disk saving quantity for the virtual disk is greater than a predefined threshold, checking if a frequency of disk size variations is lower than a predefined frequency threshold, checking whether the difference between a current virtual disk usage with respect to a host occupancy is greater than another predefined threshold.

8. A system, comprising:
a memory unit for storing a computer program for optimizing virtual storage size in a virtual computer system comprising at least one virtual machine, each of said at least one virtual machine being allocated one or more virtual disks; and a processor coupled to said memory unit, wherein said processor, responsive to said computer program, comprises:

circuitry for determining a target set of virtual machines among said at least one virtual machine comprised in said virtual computer system based on information related to said at least one virtual machine and on shrinking constraints;

for each virtual machine in said target set of virtual machines, circuitry for identifying each virtual disk allocated to said virtual machine; and for each virtual disk allocated to said virtual machine, circuitry for analyzing said virtual disk, circuitry for estimating a virtual disk saving quantity based on the virtual disk analysis, circuitry for generating a resized virtual disk based on the estimated virtual disk saving quantity, and circuitry for replacing said virtual disk with said resized virtual disk.

9. The system of claim 8, wherein the circuitry for determining said target set of virtual machines comprises for each virtual machine in said virtual computer system and for each virtual disk in said each virtual machine:

circuitry for analyzing said virtual disk; and circuitry for adding said virtual machine to said target set of virtual machines if a condition related to a state of at least one virtual disk allocated to said virtual machine is satisfied.

10. The system of claim 9, wherein said processor further comprises:

circuitry for marking said virtual disk satisfying said condition.

11. The system of claim 8, wherein the target set of virtual machines is identified by said shrinking constraints.

12. The system of claim 8, wherein the circuitry for determining the target set of virtual machines comprises:

for each virtual machine in the virtual computer system, circuitry for adding the virtual machine to the target set if a condition related to a virtual machine state is satisfied.

13. The system of claim 12, wherein said condition comprises checking if a current virtual machine is in an active state.

14. A system, comprising:

a memory unit for storing a computer program for optimizing virtual storage size in a virtual computer system comprising at least one virtual machine, each of said at least one virtual machine being allocated one or more virtual disks; and a processor coupled to said memory unit, wherein said processor, responsive to said computer program, comprises:

circuitry for determining a target set of virtual machines among said at least one virtual machine comprised in said virtual computer system based on information related to said at least one virtual machine and on shrinking constraints;

for each virtual machine in said target set of virtual machines, circuitry for identifying each virtual disk allocated to said virtual machine; and for each virtual disk allocated to said virtual machine, circuitry for analyzing said virtual disk, circuitry for estimating a virtual disk saving quantity based on the virtual disk analysis, circuitry for generating a resized virtual disk based on the estimated virtual disk saving quantity, and circuitry for replacing said virtual disk with said resized virtual disk;

wherein the circuitry for determining said target set of virtual machines comprises for each virtual machine in said virtual computer system and for each virtual disk in said each virtual machine:

circuitry for analyzing said virtual disk; and circuitry for adding said virtual machine to said target set of virtual machines if a condition related to a state of at least one virtual disk allocated to said virtual machine is satisfied;

wherein said condition comprises at least one of the following: checking if the disk saving quantity for the virtual disk is greater than a predefined threshold, checking if a frequency of disk size variations is lower than a predefined frequency threshold, checking whether the difference between a current virtual disk usage with respect to a host occupancy is greater than another predefined threshold.

\* \* \* \* \*